Patented Apr. 22, 1952

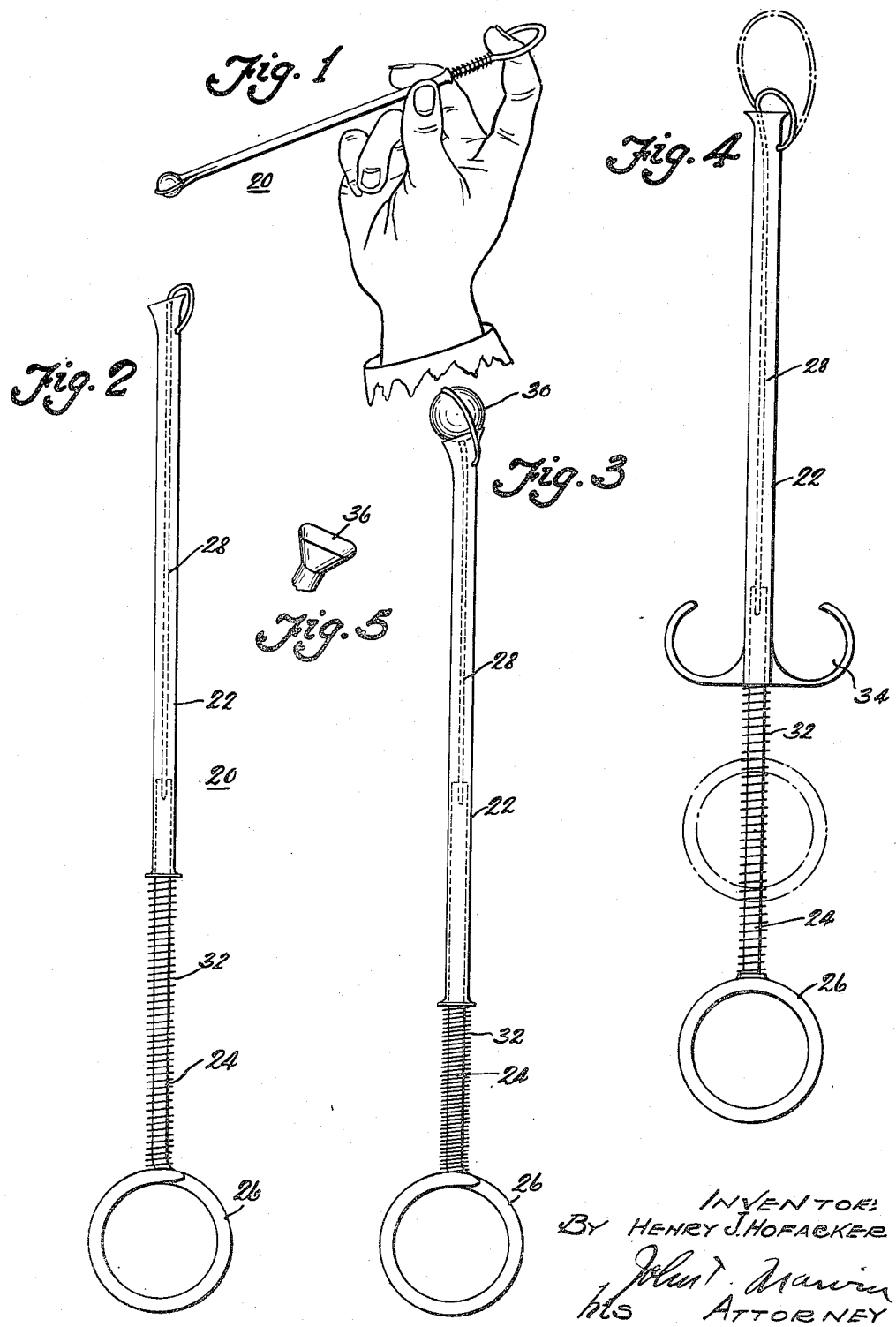

2,593,757

UNITED STATES PATENT OFFICE 2,593,757

ORAL APPLICATOR

Henry J. Hofacker, Worthington, Ohio

Application October 6, 1948, Serial No. 53,035

4 Claims. (Cl. 128—264)

This invention relates to applicators and is particularly concerned with oral applicators for the administration of pills and the like.

It is therefore the primary object of this invention to provide an applicator for the oral administration of pills and the like which is simple in design, inexpensive and efficient in its operation.

In carrying out the above object, it is a further object to provide an applicator comprising an elongated body member adapted to be inserted into the mouth, which body member has a plunger or operating member associated therewith that is movable to an inward and outward position, and in which cord-like means are provided for connecting the body member to the inner end of the plunger whereby the cord-like means is drawn tight when the operating member is in an outward position and presents a loop when the operating member is in an inward position. In this manner a pill or the like may be held against the body member by the loop and may be inserted in the mouth behind the root of the tongue and then through the operating means may be released to drop into the throat. Spring means may be used to urge the operating member towards its outward position so that the pill or the like will be held in position until released.

Further objects and advantages will be apparent, reference being had to the description that follows and to the drawings which show preferred forms of the invention.

In the drawings:

Fig. 1 is a view showing the proper manner of using the applicator, with a pill in place.

Fig. 2 is a plan view of one form of the invention with the operating means in an extreme position.

Fig. 3 is a view of the applicator with a pill therein and the operating means in an inward position.

Fig. 4 is a view of another form of the invention, the dotted lines showing the inward position of the operating means with its effect on the holding device or cord, and Fig. 5 is a partial view of the end of the applicator showing a preferred flared construction.

Dosing devices for the administration of pills, capsules and similar medicaments to animals all follow a single design. These devices are directed to a gun type applicator commonly termed a "bolling gun" and consist of a tubular member having a spring pressed plunger that ejects the pill into the mouth of the patient. Each of the devices has the same inherent drawback, namely, each device must be of the proper size for the dosage desired to be given. This necessitates a veterinary carrying a number of guns in order to properly dose animals with a variety of different sized pills and capsules. Furthermore, these guns are expensive thereby eliminating their possible use by the layman.

I have invented a new type applicator that is inexpensive, thoroughly efficient and completely useful for the administration of pills and capsules of all sizes. This device is simple to operate and may be used by skilled and lay persons alike with complete satisfaction.

When dosing an animal it is necessary to place the pill or the like behind, or back of the base of the tongue, whereupon the animal will swallow the dose. This may be accomplished by providing an elongated instrument such as is shown at 20 in Fig. 2. The instrument 20 includes an elongated body member or applicator 22 and a slidable plunger 24 inserted at one end thereof. The plunger 24 has a loop 26 at its outer end for ease in handling. The inner end of the plunger 24 is attached to a tape 28 which extends through the tubular member 22 and is suitably rigidly attached to the outside thereof adjacent its outer end, as shown in Fig. 2. When the plunger 24 is pressed inwardly the tape 28 is looped as shown in Fig. 3 and a pill as designated at 30 may be held thereby. In order to facilitate the holding of the pill, a spring 32 is provided which acts between the body member and the plunger to normally urge the plunger towards its outer position. In this manner the pill is resiliently held in place.

In order to administer the pill, the applicator is held in the hand as shown in Fig. 1 and the end thereof is inserted within the animal's mouth with the pill positioned behind the base of the tongue, whereupon the plunger is pressed inwardly and the pill is dropped into the throat.

In practice I prefer to use a plastic coated fabric tape for the tape 28 but it is apparent that any cord-like means may be used such as, a nylon string, a tape, catgut, stainless steel wire or tape or in fact any cord-like medium that satisfies the purpose and has sufficient resiliency to be flexed from one position to the other. Also in practice I use plastic tubing for member 28, such as butyl acetate, cellulose acetate, polystyrene, etc. The plunger may be made of like material in rod form. In a more expensive design all parts may be fabricated from stainless steel whereupon the instrument takes the form shown in Fig. 4 wherein a grip 34 is provided. All of these modifications come within the scope of my invention which basically is directed to the use of a loop that may be manipulated to hold and dispense a pill, capsule or any other solid or substantially solid medicament.

In all forms of the invention I find that the design of the mouth of the applicator may be flared for best results. In this respect a bell mouthed or flared end as shown at 36 in Fig. 5 appears to give the best results. This generally oval flare accommodates pills and capsules of all sizes and shapes and makes them easier to secure within the loop. Obviously, this flare is not entirely necessary to the success of the invention but it does facilitate the "loading" of the device.

From the foregoing it will be manifest that I have provided a simple and inexpensive pill dispensing device or applicator that may be used advantageously in dosing of dogs, cats, horses and in fact all small or large animals or humans where the administration of pills and the like is a usual difficult problem. The device may be made in varying lengths and sizes to accommodate its intended use although I have found that due to the design of the sliding plunger, great flexibility is obtained so that a large variety of sizes of pills may be accommodated by a single device.

While the forms of embodiment of the present invention as herein disclosed, constitute preferred forms, it is to be understood that other forms might be adopted, all coming within the scope of the claims which follow.

What is claimed is as follows:

1. A device for the oral administration of pills and the like, comprising in combination; an elongated tubular body member, a plunger slidable in said body member at one end thereof, a flexible, elongated cord-like member attached to said body member at one end thereof and to the inner end of said plunger through said tubular body member at the other end thereof, said cord-like member being of sufficient length to present a loop when the plunger member is within the body member at one extreme position and to be held tightly against the body member when the plunger is in its other extreme position, and resilient means acting between the body member and the plunger for normally holding said plunger in one of its extreme positions.

2. A device for the oral administration of pills and the like, comprising in combination; an elongated tubular applicator adapted to be inserted into the mouth, a plunger slidable within said tubular applicator, a cord-like flexible member attached to the applicator adjacent the one end thereof and passing through the applicator and attached to the inner end of the plunger, said member having such a length as to limit the outward movement of the plunger and prevent the plunger from being removed from the applicator whereby the member is held tightly against the applicator at its one end, said member presenting a loop when the plunger is moved inwardly with respect to the applicator, and spring means acting between the applicator and the plunger for normally holding the plunger in an outward position.

3. A device for the oral administration of pills and the like, comprising in combination; an elongated applicator, a plunger adapted to slide within said applicator at one end thereof and to extend a substantial distance therein when in one extreme position, a tape attached to the outside of the applicator at the other end thereof and passing through said applicator and being attached to the inner end of said plunger, said tape being of such length so as to be drawn tight when the plunger is partially withdrawn from the applicator and present a loop when the plunger is in an extreme inward position and a spring acting between said applicator and said plunger for normally holding the tape tight, whereby the tape may be looped by pressing the plunger inwardly.

4. A device for the oral administration of pills and the like, comprising in combination; an elongated tubular applicator adapted to be inserted in the mouth, a plunger slidable within said tubular applicator, a cord-like flexible member attached to the applicator adjacent the one end thereof and passing therethrough and attached to the inner end of the plunger, said member having such a length as to limit the outward movement of the plunger and prevent the plunger from being removed from the applicator whereby the member is held tightly against the applicator at its one end, said member presenting a loop when the plunger is moved inwardly with respect to the applicator, means for normally resiliently holding said plunger in position so that the member is held tightly against the applicator and an oval flared portion provided at the end of said applicator opposite the plunger end, said flare being of such size and shape as to act as a seat for pills and the like of varying sizes and contours.

HENRY J. HOFACKER.

REFERENCES CITED

The following references are of record in the file of this patent:

UNITED STATES PATENTS

| Number | Name | Date |
|---|---|---|
| 453,508 | Ruby | June 2, 1891 |
| 574,012 | Strout | Dec. 29, 1896 |
| 747,444 | La Veine | Dec. 22, 1903 |
| 977,004 | Grimm | Nov. 29, 1910 |
| 1,809,423 | Peck | June 9, 1931 |
| 2,007,626 | Waring | July 9, 1935 |

FOREIGN PATENTS

| Number | Country | Date |
|---|---|---|
| 24,318 | Great Britain | Nov. 9, 1903 |